United States Patent
Hara et al.

(10) Patent No.: US 6,896,989 B2
(45) Date of Patent: May 24, 2005

(54) SOLID ELECTROLYTE FUEL CELL AND RELATED MANUFACTURING METHOD

(75) Inventors: Naoki Hara, Kanagawa-ken (JP); Mitsugu Yamanaka, Kanagawa-ken (JP); Fuminori Satou, Kanagawa-ken (JP); Masaharu Hatano, Kanagawa-ken (JP); Keiko Kushibiki, Kanagawa-ken (JP); Tatsuhiro Fukuzawa, Kanagawa-ken (JP); Itaru Shibata, Kanagawa-ken (JP); Makoto Uchiyama, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 430 days.

(21) Appl. No.: 10/217,409

(22) Filed: Aug. 14, 2002

(65) Prior Publication Data

US 2003/0044667 A1 Mar. 6, 2003

(30) Foreign Application Priority Data

Aug. 14, 2001 (JP) .................................... P 2001-246066

(51) Int. Cl.$^7$ ............................ H01M 8/10; B05D 5/12
(52) U.S. Cl. ........................................ 429/30; 427/115
(58) Field of Search .............................. 429/30; 427/115

(56) References Cited

U.S. PATENT DOCUMENTS

| | | | | |
|---|---|---|---|---|
| 5,403,461 A | * | 4/1995 | Tuller et al. | ................. 204/252 |
| 5,509,189 A | * | 4/1996 | Tuller et al. | ................. 29/623.1 |
| 5,753,385 A | | 5/1998 | Jankowski et al. | ............. 429/44 |
| 6,007,683 A | | 12/1999 | Jankowski et al. | ..... 204/192.17 |

FOREIGN PATENT DOCUMENTS

JP 5-121084 5/1993

* cited by examiner

Primary Examiner—Patrick Ryan
Assistant Examiner—Thomas H. Parsons
(74) Attorney, Agent, or Firm—McDermott Will & Emery LLP

(57) ABSTRACT

An SOFC is provided with an oxidizing electrode layer, a reducing electrode layer opposite to the oxidizing electrode layer, a solid electrolyte layer between the oxidizing electrode layer and the reducing electrode layer, and an alternating laminated structural section between the oxidizing electrode layer and the solid electrolyte layer or between the reducing electrode layer and the solid electrolyte layer. The alternating laminated structural section has a first thin film layer including a material of corresponding one of the electrode layers and a second thin film layer having a phase including the material of the corresponding one of the electrode layers and that of the solid electrolyte layer. The first thin film layer and the second thin film layer are alternately laminated.

14 Claims, 7 Drawing Sheets

SOLID ELECTROLYTE FUEL CELL AND RELATED MANUFACTURING METHOD

BACKGROUND OF THE INVENTION

The present invention relates to a solid electrolyte fuel cell (a solid oxide electrolyte fuel cell: hereinafter referred to as an SOFC) using a solid electrolyte to obtain an electrical energy through electrochemical reaction and its related manufacturing method and, more particularly, to an SOFC equipped with an intermediate layer composed of thin film layers alternately laminated in an area between an electrode layer and a solid electrolyte layer, and its related manufacturing method.

The SOFC is structured to include a solid electrolyte, having ion conductivity properties such as an oxygen ion or proton, which is intervened between an oxidizing electrode and a reducing electrode and serves as a battery which allows oxidation gas containing oxygen gas to be supplied to the oxidizing electrode and reducing gas containing hydrogen or hydrocarbons to the reducing electrode whereby these gases react with one another through electrochemical reaction by means of the solid electrolyte.

In general, for the solid electrolyte, stabilized zirconia composed of zirconia ($ZrO_2$) added with yttria ($Y_2O_3$) or scandia ($Sc_2O_3$), ceria ($CeO_2$) system materials, $Bi_2O_3$ system materials or lanthanum gallate ($LaGaO_3$) system materials with a perovskite structure is used. It is important for the solid electrolyte to have a performance not to allow electrons to be conducted but to allow ion transfer and, in a case where oxygen ion is a charge carrier, it is desired for the solid electrolyte to have a high conductance characteristic as to the oxygen ion. Also, another important characteristic of the solid electrolyte layer involves a gas impermeable property.

For the oxidizing electrode, it is a general practice to use metallic based materials such as silver (Ag) or platinum (Pt) and oxide material with the perovskite structure represented by LaSrMnO or LaSrCoO. The oxidizing electrode is required to have a characteristic that has high oxidation resistant property, high oxygen permeable property and a high electric conductivity, and also provides an excellent property of catalysis that converts oxygen molecules to oxygen ions.

Further, for the reducing electrode, it is a general practice to use materials such as nickel (Ni) or cermet composed of nickel and the solid electrolyte. The reducing electrode is required to have a characteristic that is resistant to a reducing atmosphere, a high reducing gas permeable property and a high electric conductivity, and also provides an excellent property of catalysis that converts hydrogen molecules to protons.

That is, the SOFC is structured with the component layers composed of respective films (layers) having such characteristics set forth above.

More particularly, the SOFC has a structure in which the solid electrolyte layer is kept between the reducing electrode layer and the oxidizing electrode layer, i.e. a structure laminated with three materials having different constituents. And, in such a structure, there are some instances where the coefficients of thermal expansion of the respective layers are different from one another.

Japanese Patent Application Laid-Open Publication No. H5-121084 discloses a structure in which the ratio of metallic materials forming a reducing electrode layer is continuously varied toward the outside from a portion corresponding to a surface of a solid electrolyte layer to remove a constituent boundary surface between the electrolyte layer and the reducing electrode layer.

U.S. Pat. Nos. 5,753,385 and 6,007,683 disclose a structure in which, in order that a difference in a coefficient of thermal expansion between a solid electrolyte layer and respective electrode layers is minimized, a mixed layer of electrolyte material and electrode material is formed as an intermediate layer between an electrolyte layer and reducing and oxidizing electrode layers.

SUMMARY OF THE INVENTION

However, upon extensive studies conducted by the present inventors of the present patent application, even though the above structures, i.e. the structure in which the constituents are inclined by continuously increasing the constituent concentration of the electrode materials or the structure in which the mixed layer is intervened between the electrolyte material and the electrode material tend to cancel out the difference in the coefficient of thermal expansion between the associated layers, it is desired for the SOFC to be more highly improved in heat resistance property for the high temperature operation and for the temperature rise time or the temperature drop time.

The present invention has been completed with the above view in mind and has an object to provide an SOFC and its related manufacturing method which provides further improved heat resistant properties for a high temperature operation and for a temperature rise time and for a temperature drop time to effectively preclude a peeling-off phenomenon of associated layers between an electrode layer and a solid electrolyte layer.

According to one aspect of the present invention, there is provided an SOFC comprising: an oxidizing electrode layer; a reducing electrode layer provided in opposition to the oxidizing electrode layer; a solid electrolyte layer provided between the oxidizing electrode layer and the reducing electrode layer; and an alternating laminated structural section provided in at least one of an area between the oxidizing electrode layer and the solid electrolyte layer and an area between the reducing electrode layer and the solid electrolyte layer. The alternating laminated structural section includes a first thin film layer, which includes a material of corresponding one of the oxidizing electrode layer and the reducing electrode layer, and a second thin film layer, which has a phase including the material of the corresponding one of the oxidizing electrode layer and the reducing electrode layer and a material of the solid electrolyte layer. The first thin film layer and the second thin film layer are alternately laminated.

According to another aspect of the present invention, there is provided an SOFC comprising: an oxidizing electrode layer; a reducing electrode layer provided in opposition to the oxidizing electrode layer; a solid electrolyte layer provided between the oxidizing electrode layer and the reducing electrode layer; and an alternating laminated structural section provided in at least one of an area between the oxidizing electrode layer and the solid electrolyte layer and an area between the reducing electrode layer and the solid electrolyte layer. The alternating laminated structural section includes a first thin film layer, which includes a material of corresponding one of the oxidizing electrode layer and the reducing electrode layer, and a second thin film layer. The first thin film layer and the second thin film layer are alternately laminated. The second thin film layer has a coefficient of thermal expansion with a value between a coefficient of thermal expansion of the material of the corresponding one of the oxidizing electrode layer and the reducing electrode layer and a coefficient of thermal expansion of a material of the solid electrolyte layer or a value equivalent to the coefficient of thermal expansion of the material of the solid electrolyte layer.

Besides, according to another aspect of the present invention, there is provided a method of manufacturing an SOFC comprising: forming one of an oxidizing electrode layer and a reducing electrode layer; forming a solid electrolyte layer on the one of the oxidizing electrode layer and the reducing electrode layer; forming another one of the oxidizing electrode layer and the reducing electrode layer on the solid electrolyte layer; and forming an alternating laminated structural section in at least one of an area between the oxidizing electrode layer and the solid electrolyte layer and an area between the reducing electrode layer and the solid electrolyte layer. The alternating laminated structural section includes a first thin film layer, which includes a material of corresponding one of the oxidizing electrode layer and the reducing electrode layer, and a second thin film layer, which has a phase including the material of the corresponding one of the oxidizing electrode layer and the reducing electrode layer and a material of the solid electrolyte layer. The first thin film layer and the second thin film layer are alternately laminated.

Also, according to another aspect of the present invention, there is provided a method of manufacturing an SOFC comprising: forming one of an oxidizing electrode layer and a reducing electrode layer; forming a solid electrolyte layer on the one of the oxidizing electrode layer and the reducing electrode layer; forming another one of the oxidizing electrode layer and the reducing electrode layer on the solid electrolyte layer; and forming an alternating laminated structural section in at least one of an area between the oxidizing electrode layer and the solid electrolyte layer and an area between the reducing electrode layer and the solid electrolyte layer, the alternating laminated structural section including a first thin film layer, which includes a material of corresponding one of the oxidizing electrode layer and the reducing electrode layer, and a second thin film layer. The first thin film layer and the second thin film layer are alternately laminated. The second thin film layer has a coefficient of thermal expansion with a value between a coefficient of thermal expansion of the material of the corresponding one of the oxidizing electrode layer and the reducing electrode layer and a coefficient of thermal expansion of a material of the solid electrolyte layer or a value equivalent to the coefficient of thermal expansion of the material of the solid electrolyte layer.

Other and further features, advantages, and benefits of the present invention will become more apparent from the following description taken in conjunction with the following drawings.

DETAILED DESCRIPTION OF THE PREFERRED EMBODIMENT

Before entering into a detailed description of respective examples of the present invention, an SOFC of a preferred embodiment of the present invention is first briefly described hereinafter with suitable reference to its related manufacturing method.

Figure 1:
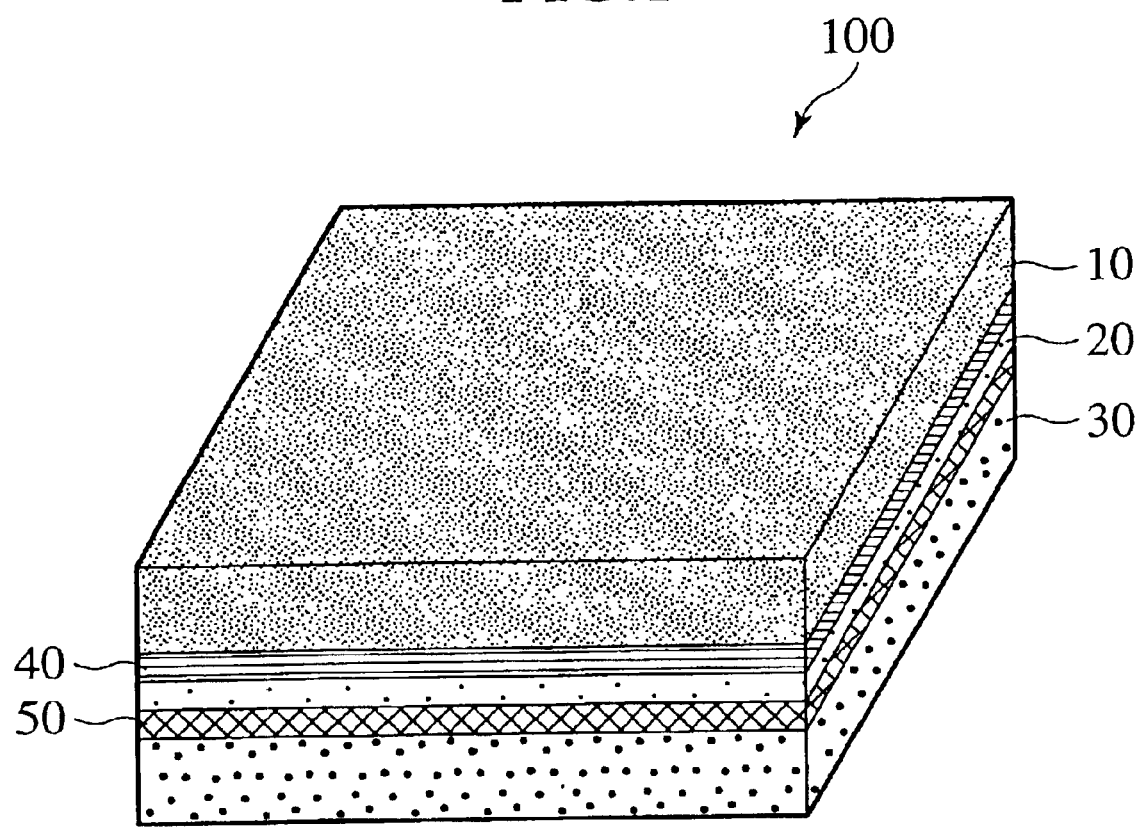
FIG. 1 is a perspective view illustrating a schematic structure of an SOFC (unit cell) according to the present invention.

FIG. 1 is a schematic perspective view of the SOFC 100 of the preferred embodiment shown in a simplified structure composed of a unit cell (unit power generating cell) for convenience sake. Also, such an SOFC 100 is shown as a principal structure and, in addition, may include a substrate or the like that would be used when laminating respective component layers forming the unit cell. Further, each electrode layer may be formed in a structure to have a function of such a substrate. Furthermore, the SOFC 100 may be formed with separator layers, i.e. the uppermost layer and the lower most layer, which serve as separators when laminated in the unit cell. Moreover, the substrate and the separator layers may be formed with gas supply channels (gas supply sections) to supply associated gases to respective electrode layers.

In FIG. 1, the SOFC (unit cell) 100 is presupposed to have a structure in which a solid electrolyte layer 20 is caught between an oxidizing electrode layer 10 and a reducing electrode layer 30, i.e. a laminated structure which includes three material layers having different properties.

For instance, the SOFC may frequently include a combination of the solid electrolyte layer 20, which is composed of stabilized zirconia substituted with yttria of 8 mol % (hereinafter, referred to as 8YSZ), and the reducing electrode layer 30 which is composed of Ni. With such a structure having these compounds, the 8YSZ layer has the coefficient of thermal expansion of $9.9\times10^{-6}/°$ C. and the Ni layer has the coefficient of thermal expansion of $13.3\times10^{-6}/°$ C. Thus, it is conceivable that due to a difference in such coefficients of thermal expansion, boundary surfaces of both the layers tend to be peeled off at a high operating temperature.

However, upon a further detailed study, it is conceivable that even when such a difference in the coefficient of thermal expansion may provide a major cause for peeling-off of the associated layers at the high temperature, such a peeling-off phenomenon may not arise simply from the difference in the coefficients of thermal expansion but may seem to occur on a reason in that an adhesion between the associated layers does not withstand an increase in stress (resulting stress strain) between the associated layers caused by increased thermal stresses of the respective layers due to the difference in the coefficients of thermal expansion. And, it is conceived that the larger the thickness of the respective layers, the larger will be the thermal stress.

This leads to a thinking that, in order for the peeling-off phenomenon between the associated layers to be effectively limited, a key point does not merely rely on a technology for minimizing the difference in the coefficients of thermal expansion, but relies on a technique for realizing a structure in which the adhesion between the associated layers made of materials having different coefficients of thermal expansion is determined to have a value relatively exceeding the level of influence of the stress strain caused by the thermal expansion between such associated layers. Upon a further detailed study with such a view in mind, it is concluded that, in order for the peeling-off phenomenon between the associated layers to be effectively limited, it is advisable not only to adopt a structure which is intervened with an intermediate layer adapted to mitigate the difference in the coefficients of thermal expansion to provide a structure which is aimed principally at merely improving the coefficient of thermal expansion, or a structure which forms a gradient of progressively higher density in material compositions, but also to provide a structure which includes a thin film layer formed by suitably controlling the film thickness of the layers and which such thin film layers are suitably laminated in combination to mitigate the generation of thermal stress.

That is, the SOFC of the preferred embodiment is realized upon various studies set forth above and also aims at the adhesion between the associated layers caused by a force acting between the associated layers provided in a laminated structure per se which is formed by resulting films so as to provide a laminated structural section which effectively takes advantage of the adhesion between the associated layers while enabling a further improved heat-resistant property to be provided.

Figure 2A:
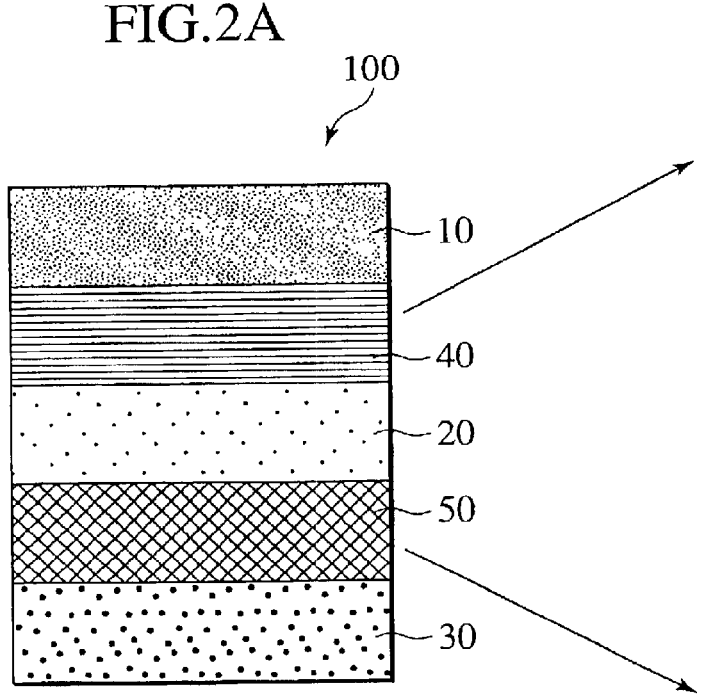
FIG. 2A is a cross sectional view of the SOFC shown in FIG. 1 of the preferred embodiment.
Figure 2B:
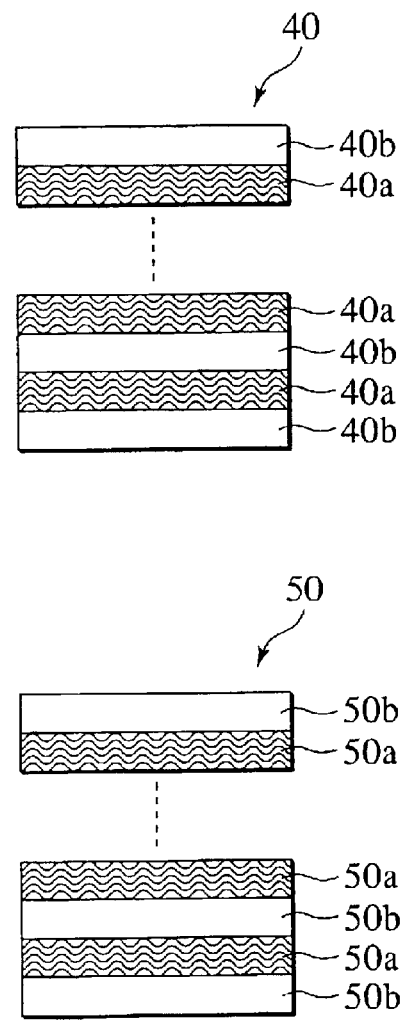
FIG. 2B is an enlarged cross sectional view of first and second alternating laminated structural sections of the SOFC shown in FIG. 2A.

In particular, as will be understood by referring to FIGS. 2A and 2B which show cross sectional views of the SOFC 100 of the preferred embodiment, the SOFC 100 has a basic structure which includes the oxidizing electrode 10, the reducing electrode 30 and the solid electrolyte layer 20 caught between these components and which further includes a first alternating laminated structural section 40 formed between the oxidizing electrode 10 and the solid electrolyte layer 20 and a second alternating laminated structural section 50 formed between the solid electrolyte layer 20 and the reducing electrode 30. In this connection, it is to be noted that, of course, the preferred embodiment is not limited to a particular laminating order of these layers, i.e. an upper and lower order shown in FIG. 2A and these layers may be formed in a reversed order.

More particularly, further, as shown in FIG. 2B in an enlarged scale, the first alternating laminated structural section 40 has a structure which is alternately laminated with a first thin film layer 40a containing the same material as the oxidizing electrode layer 10, and a second thin film layer 40b formed in a multi-components phase with a material of the oxidizing electrode layer 10 and a material of the solid electrolyte layer 20 (phase which includes the material of the oxidizing electrode layer 10 and the material of the solid electrolyte layer 20). Likewise, the second alternating laminated structural section 50 has a structure which is alternately laminated with a third thin film layer 50a containing the same material as that of the reducing electrode layer 30, and a fourth thin film layer 50b formed in a multi-components phase with a material of the reducing electrode layer 30 and a material of the solid electrolyte layer 20 (phase which includes the material of the reducing electrode layer 30 and the material of the solid electrolyte layer 20). Stated another way in conjunction with the first alternating laminated structural section 40, the second film layer 40b formed in the multi-components phase with the material of the oxidizing electrode layer 10 and the material of the solid electrolyte layer 20 has the coefficient of thermal expansion between the coefficient of thermal expansion of the material of the oxidizing electrode layer 10 and the coefficient of thermal expansion of the material of the solid electrolyte layer 20, or the coefficient of thermal expansion substantially equivalent to that of the material of the solid electrolyte layer 20, while having electric conductivity. Thus, functionally saying, in place of the second thin film layer 40b formed in the multi-components phase with the material of the oxidizing electrode layer 10 and the material of the solid electrolyte layer 20, it is also possible to employ a fifth thin film layer which is composed of a material that presents the coefficient of thermal expansion between the coefficient of thermal expansion of the material of the oxidizing electrode layer 10 and the coefficient of thermal expansion of the material of the solid electrolyte layer 20, or the coefficient of thermal expansion substantially equivalent to that of the material of the solid electrolyte layer 20, while being composed of the material having electric conductivity. Further, the alternating laminated structural section 50 may be similarly altered and, in other words, it is also possible to employ, in place of the third thin film layer 50b formed in the multi-components phase with the material of the reducing electrode layer 30 and the material of the solid electrolyte layer 20, a sixth thin film layer which is composed of a material that presents the coefficient of thermal expansion between the coefficient of thermal expansion of the material of the reducing electrode layer 30 and the coefficient of thermal expansion of the material of the solid electrolyte layer 20, or the coefficient of thermal expansion substantially equivalent to that of the material of the solid electrolyte layer 20 while being composed of material having electric conductivity.

Here, it is required that the alternating laminated structural sections 40, 50, which are intervened between the oxidizing electrode layer 10 and the solid electrolyte layer 20 and between the solid electrolyte layer 20 and the reducing electrode layer 30, respectively, are formed of the films which do not block gases from being dispersed to associated surfaces of the electrolyte layer from respective electrode layers while having a desired electric conductivity. The reason is that, for instance, in a case where one of the thin films, which are alternately laminated in the alternating laminated structural sections 40, 50, is composed of a dense electrically insulated film, such an insulated film blocks gases from being introduced from the respective electrode layers 10, 30 and also interrupts electrical conductivity between the solid electrolyte layer 20 and the respective electrode layers 10, 30, with a resultant structure which have no use as the fuel cell.

The above-described structure of the preferred embodiment aims the provision of the alternating laminated structural sections 40, 50 formed in the alternately laminated structures which are composed of the thin film layers so as to suitably contain the materials of the adjoining layers, i.e., the provision of the alternating laminated structural sections 40, 50 formed in the alternately laminated structures which are composed of the thin film layers made of materials suitably different in the coefficients of thermal expansion, resulting in a capability for the adhesion between the respective electrode layers and the solid electrolyte layer to be effectively limited from adversely affected with the thermal stresses of the respective layers to provide an improved heat-resistant property. Thus, the presence of the alternating laminated structural sections 40, 50 which are actually intervened between the respective electrode layers 10, 30 and the solid electrolyte layer 20 provides an improved higher anti-peeling-off property at the high temperature than that of the structure which includes only a single layer of an intermediate layer formed in a multi-components phase with the electrode material and the electrolyte material or that of the structure which includes only a single layer of an intermediate layer formed by merely continuously varying the concentration of ingredients of the electrode. Of course, the formation of such alternating laminated structural sections can be conducted in an easier way than forming the structure that contains metallic materials of the electrode at a continuously varying rate and has a widened freedom in complying with various processes.

Also, although it is desired for the alternating laminated structural sections to be provided in both the reducing electrode side and the oxidizing electrode side, there may be a combination which provides substantially no provability of the peeling-off of the associated layers in an actual practice depending on specific combinations between the material of the solid electrolyte layer and the materials of both the electrode layers. In such a case, the alternating laminated structural section may be provided at only one side, of both the electrode layers, that seems to have the provability of the peeling-off of the associated layers.

Further, there is no need for the material of the first thin film layer 40a that forms the first alternating laminated structural section 40 to be necessarily identical with an oxidizing electrode material of the oxidizing electrode layer 10, and the first thin film layer 40a may include other kinds of oxidizing electrode materials presenting a function of the oxidizing electrode. Likewise, there is no need for the material of the third thin film layer 50a of the second alternating laminated structural section 50 to be necessarily identical with a reducing electrode material of the reducing electrode layer 30 having the function of the reducing electrode, and the third thin film layer 50a may include other kinds of reducing electrode materials presenting a function of the reducing electrode.

Furthermore, the film thickness of each thin film layer of the alternating laminated structural sections 40, 50 may not necessarily have a fixed value and, for instance, the film thickness of the first thin film layer 40a and the film thickness of the third thin film layer 50a may be formed in a manner such that the film thickness gradually becomes thinner toward the solid electrolyte layer 20 from the associated oxidizing electrode 10 or from the reducing electrode layer 30. Conversely, the film thickness of the second thin film layer 40b and the film thickness of the fourth thin film layer 50b may be formed in a manner such that the film thickness gradually becomes thicker toward the solid electrolyte layer 20 from the associated oxidizing electrode 10 or the from reducing electrode layer 30. During such formation, in the alternating laminated structural sections 40, 50, the number of the thin film layers to be alternately laminated or the thickness of each of the thin film layers to be alternately laminated are not limited to respective particular values, but it is desired for the thin films to be alternately layered with the film thickness of equal to or less than 1 µm. The reason is that if the film thickness exceeds a value of 1 µm, there is a tendency in which a marked influence of stress appears on each thin film layer of the alternating laminated structural sections with a reduction in an effect of each of the alternating laminated structural sections.

In addition, in the SOFC of the preferred embodiment, the solid electrolyte layer 20 may include materials such as a stabilized zirconia, solid solution containing ceria and lanthanum gallate. Also, the material for the oxidizing electrode layer 10 may include compositions of LSM (LaSrMnO), LSC (LaSrCoO), Ag and Pt, etc. Moreover, the material for the reducing electrode layer 30 may include compositions of Ni, Ni-cermet, etc. Of course, the materials of the SOFC are not limited to these compositions and may be suitably selected from other materials, if desired.

To set forth the present invention more in detail hereinafter, several Examples and Comparative Examples are described below with suitable reference to the drawings and in conjunction with evaluation test results. Further, in the various Examples and Comparative Examples, substantially same component parts bear the same reference numerals throughout the drawings with a view to suitably providing a simplified description to omit the redundant description.

Initially, in order to provide a comparison in the heat-resistant properties, Examples 1 to 4 and Comparative Examples 1 and 2 are described. These Examples are based on SOFCs which are manufactured by forming respective layers in film conditions on similar substrates, with heat-treating tests of resulting SOFCs being carried out using an electric furnace.

The respective substrates used in these Examples and Comparative Examples are fabricated in a manner as will be discussed below. Incidentally, such substrates are used in the Examples and Comparative Examples except for Example 11.

First, an oriented single crystal silicon substrate with a thickness of 0.65 mm and planar shape of 10 mm square was prepared.

Next, one surface of the silicon substrate was formed with a film of SiN with a thickness of 200 nm using a low pressure plasma CVD method, and the other surface of the silicon substrate was similarly formed with a film of SiN with a thickness of 200 nm in an area except for a central part of 1 mm square.

And, a resulting substrate formed with the films was immersed in hydrazine hydrate which is maintained at a temperature of approximately 60° C. and then subjected to an anisotropic etching at the central area of 1 mm square which is not formed with the film of SiN, resulting formation of a SiN diaphragm structure of 1 mm square with a thickness of 200 nm.

Upon conducting fabrication steps set forth above, the substrate S (typically shown in FIGS. 3 to 5) having such a diaphragm structure was obtained.

EXAMPLE 1

Example 1 will be described below mainly with reference to FIG. 3.

First, the above-described substrate S was prepared, and at one surface which was entirely formed with the resulting film of SiN that was not subjected to anisotropic etching, an entire surface of SiN of the substrate S was formed with a layer of Ni which serves as the reducing electrode layer 30 with a thickness of 1 µm by RF sputtering method. Such a film forming step was carried out in an Ar atmosphere at a pressure of 10 Pa.

Next, a second alternating laminated structural section 50 was formed on the Ni surface of the reducing electrode layer 30. That is, a first layer 50b of the alternating laminated structural section 50 was formed to provide a co-sputtered layer (corresponding to the fourth thin film layer 50b described with reference to FIG. 2B) with a thickness of 50 nm using both targets composed of metal of Ni and a sintered body of stabilized zirconia substituted with yttria of 8 mol % (8YSZ). During such a sputtering operation, the sizes of the Ni target and the 8YSZ target and power outputs required for such sputtering were determined such that the ratio between the Ni and 8YSZ remained in a range of 50:50 by way of mass. Further, a film forming condition was maintained in the same Ar atmosphere as that maintained during formation of the Ni layer, and the pressure was maintained at a level of 10 Pa. Subsequently, on the co-sputtered layer 50b of Ni-8YSZ, a Ni layer 50a (corresponding to the third thin film layer 50a described with reference to FIG. 2B) was formed with a thickness of 50 nm and as a second layer of the alternating laminated structural section 50. The film forming condition under which such operation was conducted was identical with that maintained during formation of the reducing electrode layer 30. Next, film forming steps for alternating Ni-8YSZ co-sputtered layer 50b with the thickness of 50 nm and the Ni layer 50a with the thickness of 50 nm were carried out four cycles, respectively, in similar manners and, thereafter, on the Ni layer 50a, forming an eighth layer, of the alternating laminated structural section 50, the co-sputtered layer 50b of Ni-8YSZ was formed with a thickness of 50 nm again, resulting in the formation of the alternating laminated structural section 50 composed of the sum of five co-sputtered layers 50b of Ni-8YSZ and the sum of four Ni layers 50a which were laminated respectively.

Subsequently, on an upper surface of the Ni-8YSZ layer 50b, forming a ninth layer, of the alternating laminated structural section 50, a layer 20 composed of 8YSZ was formed with a thickness of 1 μm and as the solid electrolyte layer 20 similarly by RF sputtering method. The condition under which the film was formed was maintained in the same Ar atmosphere and at the same pressure of 10 Pa as in the film forming steps discussed above.

Then, a first alternating laminated structural section 40 was fabricated on an upper surface of the solid electrolyte layer 20 composed of 8YSZ by the steps of the same kind of those of the second alternating laminated structural section 50. That is, initially, a film of a co-sputtered layer 40b (corresponding to the second thin film layer described with reference to FIG. 2B) with a thickness of 50 nm using both targets composed of metal of Ag and a sintered body of 8YSZ was formed on the 8YSZ solid electrolyte layer 20. During such a sputtering operation, the power outputs required for sputtering the Ag target and the 8YSZ target were determined such that the ratio between Ag and 8YSZ remained in a range of 40:60 by way of mass. Further, the film forming condition was similarly maintained in the Ar atmosphere and at the pressure of 10 Pa. Subsequently, on the co-sputtered layer 40b of Ag-8YSZ, an Ag layer 40a (corresponding to the first thin film layer described with reference to FIG. 2B) was formed with a thickness of 50 nm as a second layer of the alternating laminated structural section 40. The film forming condition for the Ag layer was identical with that maintained during formation of the Ni layer of the reducing electrode layer 30. Next, film forming steps for alternating Ag-8YSZ co-sputtered layer 40b with the thickness of 50 nm and the Ag layer 40a with the thickness of 50 nm were alternately carried out four cycles, respectively, in similar manners and, further, on the Ag layer 40a, forming an eighth layer, of the alternating laminated structural section 40, the co-sputtered layer 40b of Ag-8YSZ was formed with a thickness of 50 nm again, resulting in the formation of the alternating laminated structural section 40 composed of the sum of five co-sputtered layers 40b of Ag-8YSZ and the sum of four Ag layers 40a which were laminated respectively.

Figure 3:
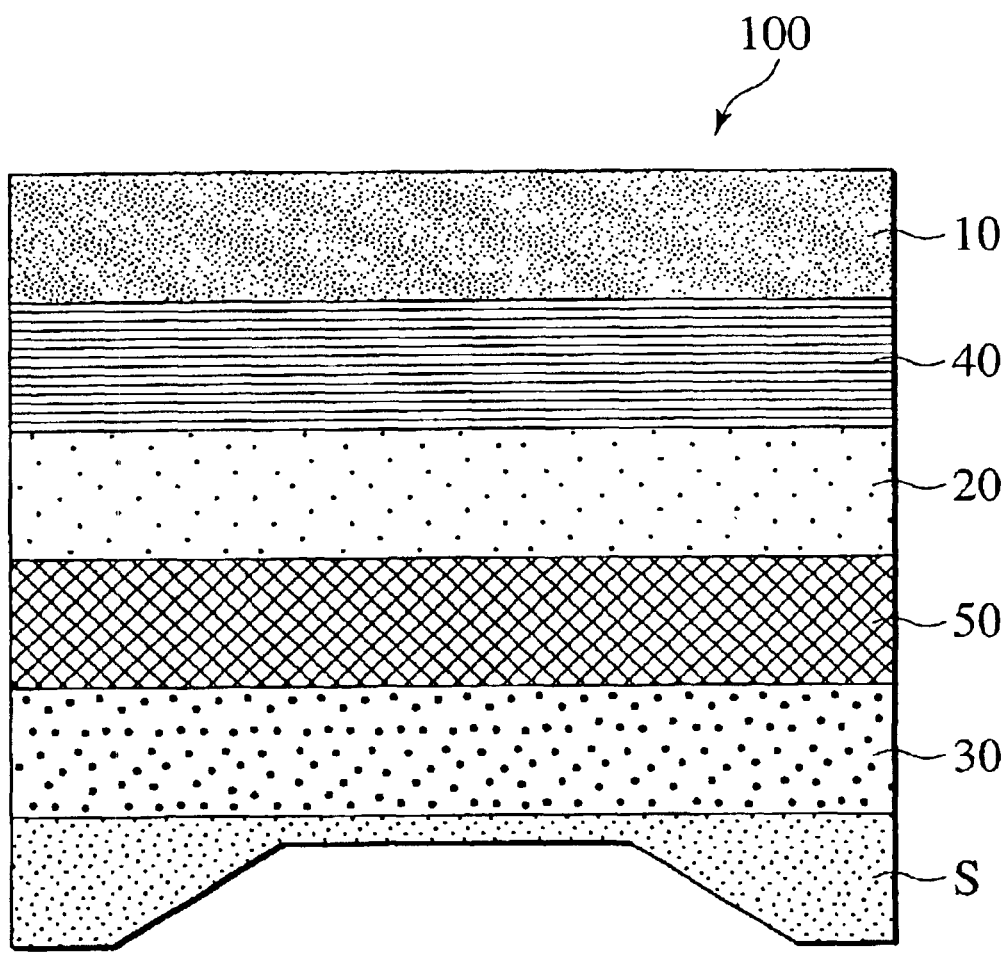
FIG. 3 is a cross sectional view of an SOFC of Examples 1 to 9 of the preferred embodiment.

And, finally, on the Ag-8YSZ layer 40b, a layer 10 of Ag was formed with a thickness of 2, μm and as the oxidizing layer 10 similarly using RF sputtering method, thereby fabricating an SOFC (unit cell) 100 of the present Example on the SiN diaphragm substrate S as shown in FIG. 3.

EXAMPLE 2

Example 2 will be described below.

In this Example, respective layers were laminated on the SiN substrate S fundamentally in the same manner as in Example 1, except for that the first alternating laminated structural section 50 was different in structure from that of the Example 1, fabricating an SOFC (unit cell) formed on the SiN substrate S to have a structure shown in FIG. 3.

More particularly, the first alternating laminated structural section 50 of this Example was structured with a co-sputtered layer 50b (corresponding to the fourth thin film layer described with reference to FIG. 2B) of Ni and Y 15% substituted $CeO_2$ (YDC), and a Ni layer 50a (corresponding to the third thin film layer described with reference to FIG. 2B). Also, during formation of the Ni-YDC co-sputtered layer 50b, the sizes of the Ni target and the YDC target and power outputs required for such sputtering were determined such that the ratio between the Ni and YDC remained in a range of 40:60 by way of mass.

EXAMPLE 3

Example 3 will be described below.

In this Example, respective layers were laminated on the SiN substrate S fundamentally in the same manner as in Example 1, except that the first alternating laminated structural section 50 is different in structure from that of the Example 1, fabricating an SOFC (unit cell) formed on the SiN substrate S to have a structure shown in FIG. 3.

The first alternating laminated structural section 50 of this Example was structured with a co-sputtered layer 50b (corresponding to the fourth thin film layer described with reference to FIG. 2B) of Ni-8YSZ, and a co-sputtered layer 50a (corresponding to the third thin film layer described with reference to FIG. 2B) of Ni-YDC. The co-sputtered layer 50a of Ni-YDC was not composed of the same material as Ni that constituted the material of the reducing electrode layer 30, but was the material that had a function of the reducing electrode. Also, during formation of the Ni-8YSZ co-sputtered layer 50b, the sizes of the Ni target and the 8YSZ target and power outputs required for such sputtering were determined such that the ratio between the Ni and 8YSZ remained in a range of 50:50 by way of mass. Further, during formation of the Ni-YDC co-sputtered layer 50a, the sizes of the Ni target and the YDC target and power outputs required for such sputtering were determined such that the ratio between the Ni and YDC remained in a range of 70:30 by way of mass.

EXAMPLE 4

Example 4 will be described below.

In this Example, also, respective layers were laminated on the SiN substrate S fundamentally in the same manner as in Example 1, except for that the first alternating laminated structural section 50 is different in structure from that of the Example 1, fabricating an SOFC (unit cell) formed on the SiN substrate S to have a structure shown in FIG. 3.

Example 4 is different from Example 1 in that the first alternating laminated structural section 50 of this Example was structured to laminate two kinds of Ni-YDC co-sputtered layers containing materials of Ni and YDC in different existing ratios. That is, a second layer 50a (corresponding to the third thin film layer described with reference to FIG. 2B) was a co-sputtered layer of Ni-YDC that was not composed of the same material as Ni that constituted the material of the reducing electrode layer 30, but was the material that had a function of the reducing electrode. Also, a first layer 50b (corresponding to the fifth thin film layer described with reference to FIG. 2B) was a co-sputtered layer of Ni-8YSZ that had a coefficient of thermal expansion remaining in a range between the coefficient of thermal expansion of $13.3 \times 10^{-6}/°$ C. of the reducing electrode layer 30 composed of Ni and the coefficient of thermal expansion of $9.9 \times 10^{-6}/°$ C. of the solid electrolyte layer 20 composed of 8YSZ.

More specifically, when forming the first layer 50b of the alternating laminated structural section 50, power outputs required for sputtering the Ni target and the YDC target were determined such that the ratio between the Ni and YDC remained in a range of 40:60 by way of mass. Further, when forming the second layer 50a of the alternating laminated structural section 50, the sizes of the Ni target and the YDC target and power outputs required for such sputtering were determined such that the ratio between the Ni and YDC remained in a range of 70:30 by way of mass. Here, the first layer 50b of the alternating laminated structural section 50 had the coefficient of thermal expansion of $11 \times 10^{-6}/°$ C. Incidentally, the second layer 50a had the coefficient of thermal expansion of $12 \times 10^{-6}/°$ C.

Comparative Example 1

Comparative Example 1 will be described below mainly with reference to FIG. 4.

First, in this Comparative Example, the above-discussed substrate S was prepared, and at one surface which was entirely formed with the resulting film of SiN that was not subjected to anisotropic etching of the substrate S, an entire surface of SiN of the substrate S was formed with a layer of Ni that serves as the reducing electrode layer 30. Such a film forming step was the same as that of the Ni layer of the reducing electrode of Example 1.

Next, on an upper surface of the Ni reducing electrode layer 30, a co-sputtered layer was formed in a film with the same thickness of 450 nm as that of the alternating laminated structural section 50 of Example 1 by RF sputtering method with the use of both targets composed of metal of Ni and a sintered body of YSZ, obtaining an intermediate layer 70. The intermediate layer 70 was composed of a mere multi-components phase that contained Ni and 8YSZ. When forming such layer, the sizes of the Ni target and the 8YSZ target and power outputs required for such sputtering were determined such that the ratio between the Ni and 8YSZ remained in a range of 50:50 by way of mass. Further, the film forming condition was maintained in the same Ar atmosphere and pressure at a level of 10 Pa as that of Example 1.

Subsequently, on an upper surface of the Ni-8YSZ, forming the intermediate layer 70, a layer of 8YSZ was formed with a thickness of 1 $\mu$m and as the solid electrolyte layer 20 by RF sputtering method in the same manner as in Example 1. Such film forming operation was conducted at the pressure at 10 Pa and in the same Ar atmosphere as in Example 1.

Next, on an upper surface of the solid electrolyte layer 20 composed of 8YSZ, a co-sputtered layer was formed in a film with the same thickness of 450 nm as that of the alternating laminated structural section 40 of Example 1 by RF sputtering method with the use of both targets composed of metal of Ag and a sintered body of YSZ, obtaining an intermediate layer 60. The intermediate layer 60 was composed of a mere multi-components phase that contained Ag and 8YSZ. When forming such layer, the sizes of the Ag target and the 8YSZ target and power outputs required for such sputtering were determined such that the ratio between the Ag and 8YSZ remained in a range of 50:50 by way of mass.

Figure 4:
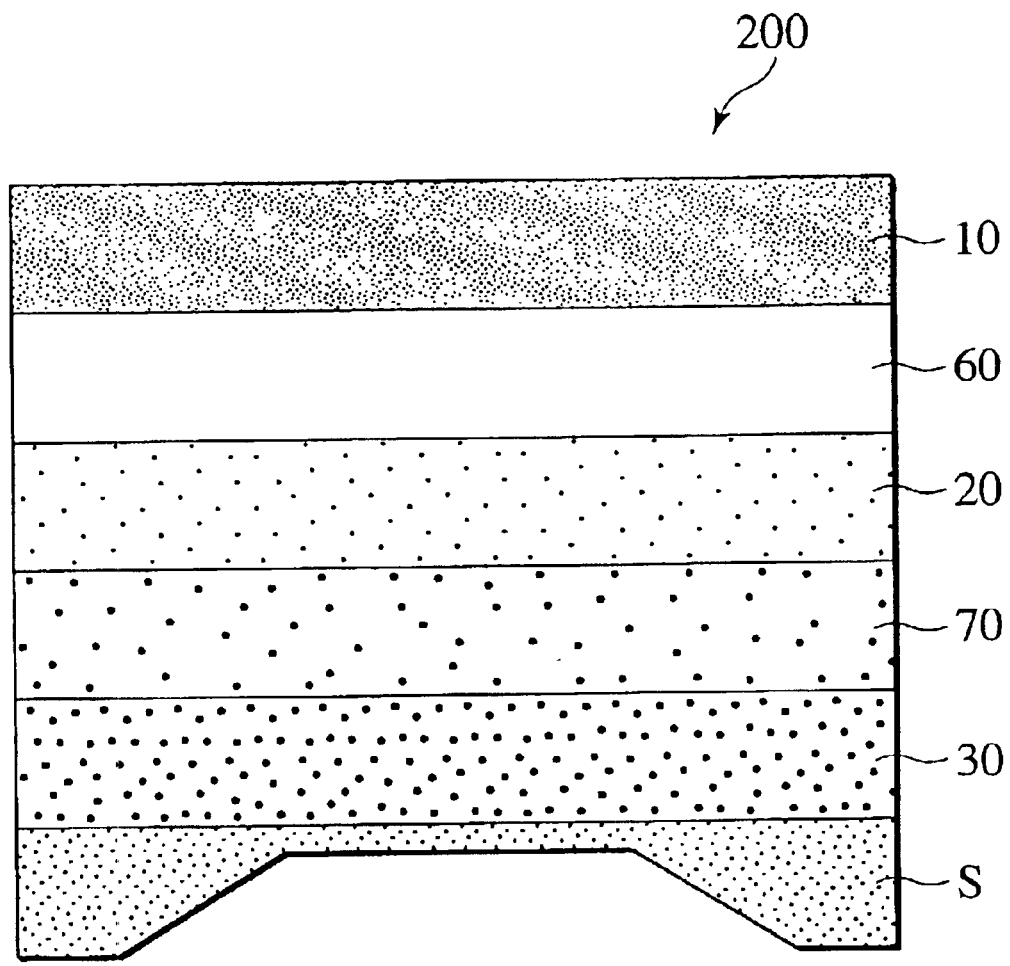
FIG. 4 is a cross sectional view of an SOFC of a Comparative Example 1 studied in the preferred embodiment.

And, finally, on an upper surface of the Ag-8YSZ layer 40b, a layer of Ag was formed with a thickness of 2 $\mu$m as the oxidizing layer 10 by RF sputtering method in the same manner as Example 1, thereby fabricating an SOFC (nit cell) 200 of this Comparative Example on the SiN diaphragm substrate S as shown in FIG. 4.

Comparative Example 2

Figure 5:
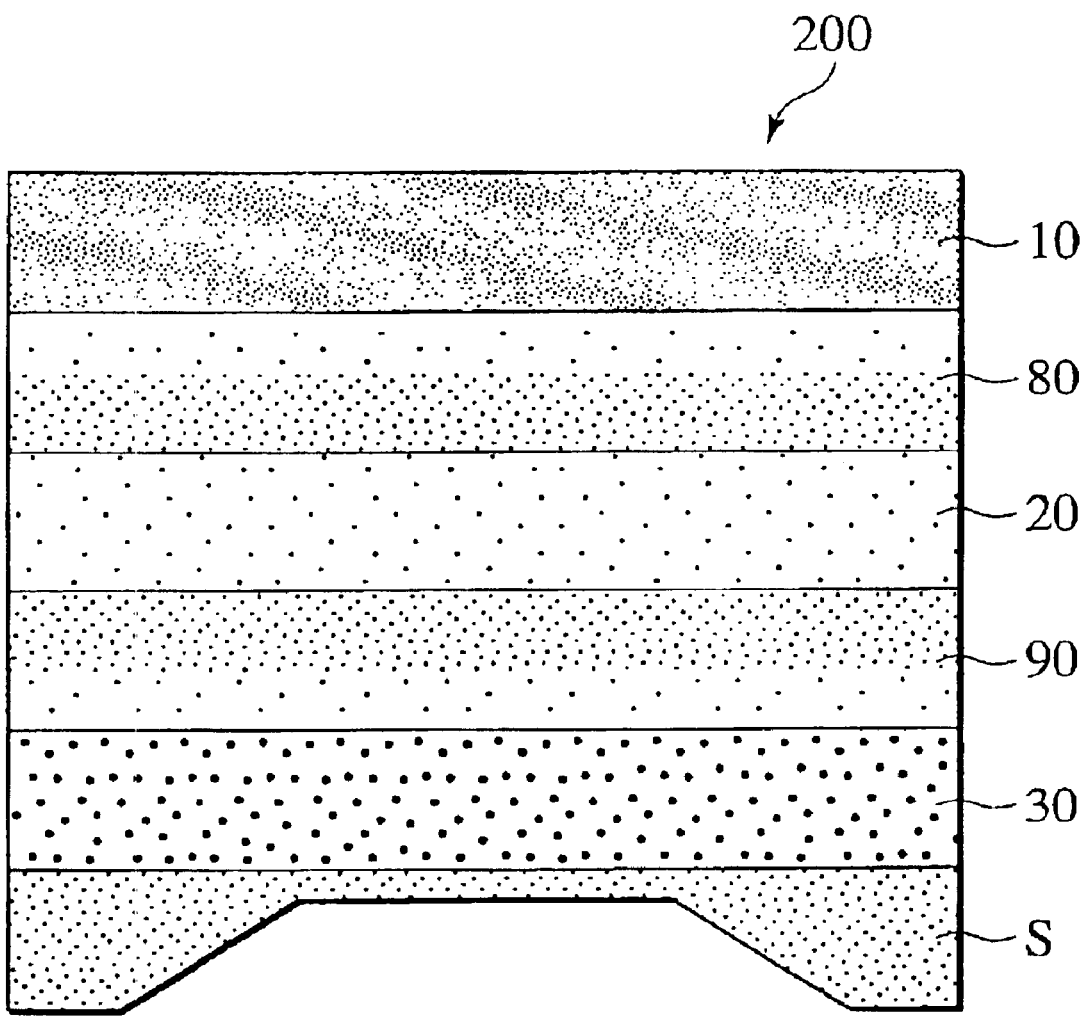
FIG. 5 is a cross sectional view of an SOFC of a Comparative Example 2 studied in the preferred embodiment.

Comparative Example 2 will be described below mainly with reference to FIG. 5.

First, in this Comparative Example, the above-described substrate S was prepared, and at an upper surface which was entirely formed with the resulting film of SiN that was not subjected to anisotropic etching of the substrate S, an entire surface of SiN of the substrate S was formed with a layer of Ni that serves as the reducing electrode layer 30. Such a film forming method was carried out in the same manner as that of the Ni layer of the reducing electrode of Example 1.

Next, on an upper surface of the Ni reducing electrode layer 30, a composition inclination layer 90 was formed with a thickness of 450 nm and as an intermediate layer composed of Ni and 8YSZ by RF sputtering method. In particular, the composition inclination layer 90 was formed by controlling the power output of sputtering under a condition determined such that a region of the composition inclination layer 90 held in contact with the Ni reducing electrode layer 30 had the existence ratio in a range of Ni:8YSZ=100:0 by consecutively and gradually decreasing the power output for sputtering Ni while gradually increasing the power output for sputtering 8YSZ and such that a region of the composition inclination layer 90 held in contact with the electrolyte layer 20 had the existence ratio in a range of Ni:8YSZ=0:100, finally obtaining the composition inclination layer 90. Such operation was conducted in the Ar atmosphere at the pressure of 10 Pa.

Subsequently, during the film forming step of the composition inclination layer 90, the film forming step of the solid electrolyte layer 20 composed of 8YSZ begun at the time instant when the composition inclination layer was composed of only material of 8YSZ when decreasing the power output for sputtering Ni to a zero level. That is, at a time subsequent to the formation of the composition inclination layer 90, as the solid electrolyte layer 20, a film composed of 8YSZ with a thickness of 1, $\mu$m was layered by RF sputtering method in the same manner as in Example 1. Such film forming operation was conducted at the pressure at 10 Pa and in the same Ar atmosphere as in Example 1.

Next, on an upper surface of the solid electrolyte layer 20 composed of 8YSZ, a composition inclination layer was layered with a thickness of 450 nm and as an intermediate layer 80 composed of 8YSZ and Ag. More particularly, like in the composition inclination layer 90, the composition inclination layer 80 was formed by controlling the sputtering condition such that a region of the composition inclination layer 80 held in contact with the solid electrolyte layer 20 had the existence ratio in a range of 8YSZ:Ag=100:0 and by consecutively and gradually decreasing the power output for sputtering 8YSZ while gradually increasing the power output for sputtering Ag and such that a region of the composition inclination layer 80 held in contact with the Ag oxidizing layer 10 had the existence ratio in a range of 8YSZ:Ag=0:100, finally obtaining the composition inclination layer 80. Such operation was conducted in the Ar atmosphere at the pressure of 10 Pa.

And, finally, during the film forming step of the composition inclination layer 80, the film forming step of the oxidizing electrode layer 10 composed of Ag begun at the time instant when the composition inclination layer was composed of only material of Ag when decreasing the power output for sputtering 8YSZ to a zero level. That is, at a time subsequent to the formation of the composition inclination layer 80, as the oxidizing electrode layer 10, a layer composed of Ag with a thickness of 2 $\mu$m was formed by RF sputtering method, fabricating an SOFC (unit cell) of the present Comparative Example formed on the SiN diaphragm substrate S. Also, such film forming operation was conducted at the pressure at 10 Pa and in the Ar atmosphere.

Evaluation Test 1

Heat resistance tests were conducted for the sum of six kinds of SOFC test pieces obtained in Examples 1 to 4 and Comparative Examples 1 and 2 in a $N_2$ atmosphere and held at respective raised temperatures of 400° C., 500° C., 600° C. and 700° C. for four hours, respectively. Also, a temperature rise speed ranged from a room temperature to respective holding temperatures and a temperature drop speed ranged from respective holding temperatures to the room temperature were selected at a value of 100° C./h.

Upon observation of surfaces and cross sections of the test pieces of Examples 1 to 4 and Comparative Examples 1 and 2 subsequent to the heat resistance tests, examination was conducted to discriminate whether laminated structures formed on the respective SiN diaphragm substrate encountered the peeled-off phenomenon in the associated layers or cracks. The examined results are shown in the following Table 1.

TABLE 1

| Structures of Alternating Laminated Structural Sections | | Holding Temperature (° C.) | | | |
|---|---|---|---|---|---|
| | | 400 | 500 | 600 | 700 |
| Example 1 | Ni:Ni-8YSZ | ○ | ○ | ○ | ○ |
| Example 2 | Ni:Ni-YDC | ○ | ○ | ○ | ○ |
| Example 3 | Ni:8YSZ:Ni-YDC | ○ | ○ | ○ | ○ |
| Example 4 | Ni:YDC:Ni-YDC | ○ | ○ | ○ | ○ |
| Comparative Example 1 | Multi-components phase (Intermediate Layer) | ○ | ○ | X | X |
| Comparative Example 2 | Composition inclination (Intermediate Layer) | ○ | ○ | X | X |

As will be apparent from the results of Table 1, it can be evaluated that the structures of Examples 1 to 4 wherein the alternating laminated structural sections 40, 50 are formed between both electrode layers 10, 30 and the solid electrolyte layer have no cracks or peeling-off phenomenon even when held at the highest temperatures of 700° C. to provide a sufficient heat resistant property (as represented by a symbol ○ in the above Table, and so on, in the following Table). In contrast, it is confirmed and evaluated that the structures of Comparative Examples wherein the intermediate layers 60, 70, which form mere multi-components phases between the electrode materials and the electrolyte material and the intermediate layers 80, 90 are formed between associated components have cracks and peeling-off phenomenon when held at an intermediate temperature of equal to or higher than 600° C. to provide an insufficient heat resistant property (as represented by a symbol × in the above Table, and so on, in the following Table).

EXAMPLES 5 TO 8

Examples 5 to 8 are described below.

In Examples 5 to 8, in order to confirm the influence of the film thickness of respective thin film layers that form the alternating laminated structural sections 40, 50, the same steps as in Example 1 were conducted to fabricate SOFCs (unit cells) structured with alternating laminated structural sections 40, 50 formed in thin film layers with varying film thickness of 5 nm (Example 5), 20 nm (Example 6), 100 nm (Example 7) and 500 nm (Example 8), respectively. Also, the SOFCs of Examples 5 to 8 had the same structures as that of Example 1 except for such alternated components.

EXAMPLE 9

Example 9 is described below.

In this Example, the same steps as in Example 1 were conducted to fabricate an SOFC (unit cell) structured with a reducing electrode layer 30 with a film thickness of 2 $\mu$m, alternating laminated structural sections 40, 50 formed in thin film layers with respective film thickness of 1 $\mu$m, and an oxidizing electrode layer with a film thickness of 4 $\mu$m. Also, the SOFC of this Example has the same structures as that of Example 1 except for such alternated components.

EXAMPLE 10

Example 10 is described below mainly with reference to FIGS. 6A and 6B.

Figure 6A:
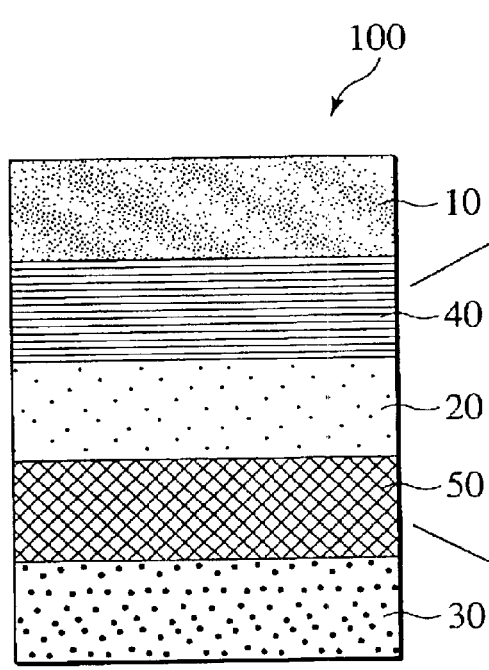
FIG. 6A is a cross sectional view of an SOFC of Example 10 of the preferred embodiment.
Figure 6B:
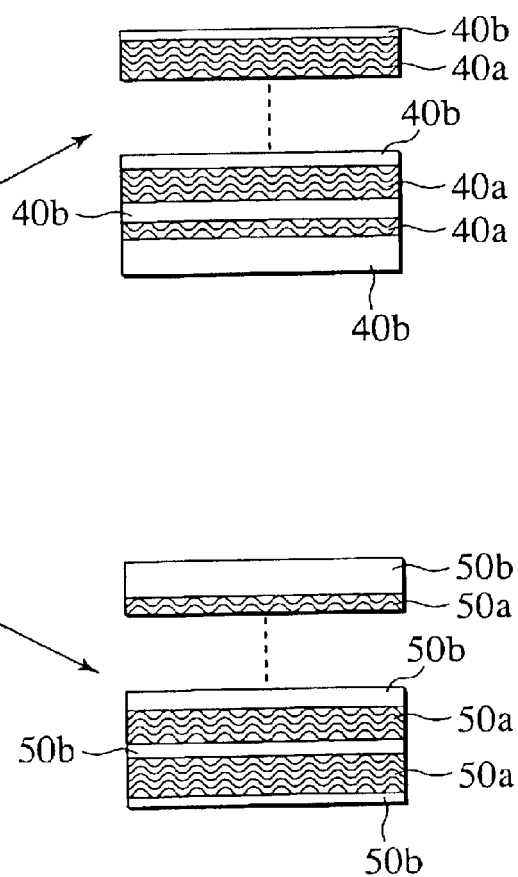
FIG. 6B is an enlarged cross sectional view of first and second alternating laminated structural sections of the SOFC shown in FIG. 6A.

The same steps as those of Example 1 were fundamentally conducted to laminate respective layers to fabricate an SOFC (unit cell) with a structure shown in FIGS. 6A and 6B in a manner except for that, in this Example, respective thin film layers forming alternating laminated structural sections 40, 50 had no equally distributed thickness but have graduations.

Initially, the substrate S discussed above was prepared (in a process which is not shown in FIGS. 6A and 6B), and a NiS surface of the substrate S was formed with a Ni layer with a film thickness of 1 $\mu$m as a reducing electrode layer 30 by RF sputtering method using metal of Ni target. The film forming operation was conducted in the Ar atmosphere and at the pressure of 10 Pa in the same manner as in Example 1.

Subsequently, on the Ni surface layered as the reducing electrode layer 30, thin film layers 50a, 50b, . . . were alternately layered with in thickness varying in graduation, thereby forming alternating laminated structural section 50, by RF sputtering method. More particularly, as shown in FIG. 6B, a first layer of the alternating laminated structural section 50 was layered in a co-sputtered layer 50b of Ni-8YSZ with a thickness of 10 nm using both targets of metal of Ni and a sintered body of 8YSZ. During a sputtering operation, power outputs required for sputtering the Ni target and 8YSZ target were selected, respectively, such that the co-sputtered layer had the existence ratio of 50:50 by way of mass. Also, the film forming condition was maintained in the same Ar atmosphere as that under which the Ni layer was fabricated as the reducing electrode layer 30, and the operating pressure was maintained at a level of 10 Pa. Then, on the co-sputtered layer 50b of Ni-8YSZ, a Ni layer 50a was layered with a thickness of 50 nm serving as a second layer of the alternating laminated structural section 50. The film forming condition was selected to be the same as used in fabricating the reducing electrode layer 30. Next, respective films were layered through control of film thickness to allow the Ni-8YSZ layer 50b to have gradually increased thickness varying from the reducing electrode layer 30 toward the solid electrolyte layer 20 while, in contrast, permitting the Ni layer 50a to have gradually decreased thickness varying from the reducing electrode layer 30 toward the solid electrolyte layer 20 in a manner such that on the Ni layer 50a, a co-sputtered layer 50b of Ni-8YSZ was formed with a thickness of 20 nm as a third layer of the alternating laminated structural section 50, and on the Ni-8YSZ layer 50b, a Ni layer 50a was further layered with a thickness of 40 nm as a fourth layer, and so on. That is, the Ni-8YSZ co-sputtered layers 50b and the Ni layers 50a were alternately layered in a manner in which the Ni-8YSZ co-sputtered layers 50b were layered with the film thickness ranging in values of 10 nm→20 nm→30 nm→40 nm→50 nm, i.e. with a gradual increase in the film thickness of 10 nm whereas the Ni layers 50a were layered with the film thickness ranging in values of 50 nm→40 nm→30 nm→20 nm, i.e. with a gradual decrease in the film thickness of 10 nm. Also, the thickness of the alternating laminated structural section 50 was thinner than that of Example 1 with the film forming steps being conducted in the same numbers of laminated patterns and repetitions.

Subsequently, on such a Ni-8YSZ layer 50b forming a ninth layer of the alternating laminated structural section 50, a solid electrolyte layer 20 composed of 8YSZ was formed with a film thickness of 1 μm by RF sputtering method. The film forming operation was conducted in the Ar atmosphere and at the pressure of 10 Pa in the same manner as Example 1.

Then, the alternating laminated structural section 40 was prepared on the 8YSZ solid electrolyte layer 20 in the same manner as the alternating laminated structural section 50, by RF sputtering method. In particular, initially, on the 8YSZ solid electrolyte layer 20, a co-sputtered layer 40b of Ag-8YSZ was layered with a film thickness of 50 nm using both targets of metal of Ag and a sintered body of 8YSZ. During such a sputtering operation, power outputs required for sputtering the Ag target and 8YSZ target were selected, respectively, such that the co-sputtered layer had the existence ratio of 40:60 by way of mass. The film forming condition was maintained in the same Ar atmosphere at an operating pressure of 10 Pa as in the manner set forth above. Then, on the co-sputtered layer 40b of Ag-8YSZ, an Ag layer 40a was layered with a film thickness of 20 nm serving as a second layer of the alternating laminated structural section 40. The film forming condition of the Ag layer 40a was selected to be the same as used in fabricating the reducing electrode layer 30. Next, respective films were layered through control of film thickness to allow the Ag-8YSZ co-sputtered layer 40b to have gradually decreased thickness varying from the solid electrolyte layer 20 toward the oxidizing electrode layer 10 while, in contrast, permitting the Ag layer 40a to have gradually increased thickness varying from the solid electrolyte layer 20 toward the oxidizing electrode layer 10. That is, the Ag-8YSZ co-sputtered layer 40b and the Ag layer 40a were alternately formed with respective film thickness in a manner in which the Ag-8YSZ co-sputtered layers 40b were layered to have film thickness ranging in values of 50 nm→40 nm→30 nm→20 nm→10 nm starting from the solid electrolyte layer 20 toward the oxidizing electrode layer 10, i.e. with a gradual decrease in the film thickness of 10 nm whereas the Ag layers 40a were layered with the film thickness ranging in values of 20 nm→30 nm→40 nm→50 nm from the solid electrolyte layer 20 toward the oxidizing electrode layer 10 from the solid electrolyte layer 20 toward the oxidizing electrode layer 10, i.e. with a gradual increase in the film thickness of 10 nm. Also, the thickness of the alternating laminated structural section 50 was thinner than that of Example 1 with the film forming steps being conducted to have the same numbers of laminated patterns and repetitions.

Finally, on the Ag-8YSZ co-sputtered layer 40b with the film thickness of 10 nm, an Ag layer was formed with a film thickness of 2 μm as the oxidizing electrode layer 10, fabricating an SOFC (unit cell) 100 of this Example formed on the SiN diaphragm substrate S.

Evaluation Test 2

Heat resistance tests were conducted for the sum of eight kinds of SOFC test pieces obtained in Examples 1 and 5 to 10 and Comparative Example 1 in the same manner as in Evaluation Test 1, and surface and cross sectional observations were conducted to investigate whether the peeling-off or cracks of the associated films were caused in the laminated structures formed on the SiN diaphragm substrates S, respectively, with evaluated results being shown in the following Table 2. As will be apparent from the results of Table 2, it was cleared that, with each of the thin film layers, having the film thickness of 1 μm, which formed the alternating laminated structural sections 40, 50 as in Example 9, the peeling-off occurred at the holding temperature of equal to or higher than 600° C. to provide the same result as those of Comparative Example 1 with no recognition of effects of the provision of the alternating laminated structural sections 40, 50 (as represented by a symbol × in Table 2). Also, in case of Example 5, since the thickness of each of the thin film layers forming the alternating laminated structural sections 40, 50 is thin and has a value of 5 nm, the alternating laminated structural sections 40, 50 had results of deteriorated heat resistance properties at the holding temperature of equal to or higher than 700° C. (as represented by a symbol × in Table 2).

TABLE 2

| | Thin Film Thickness of Alternating Laminated Structural Sections | Holding Temperature (° C.) | | | |
|---|---|---|---|---|---|
| | | 400 | 500 | 600 | 700 |
| Example 5 | 5 nm | ○ | ○ | ○ | X |
| Example 6 | 20 nm | ○ | ○ | ○ | ○ |
| Example 1 | 50 nm | ○ | ○ | ○ | ○ |
| Example 7 | 100 nm | ○ | ○ | ○ | ○ |
| Example 8 | 500 nm | ○ | ○ | ○ | ○ |
| Example 9 | 1 μm | ○ | ○ | X | X |
| Example 10 | 10~50 nm (In Gradient) | ○ | ○ | ○ | ○ |
| Comparative Example 1 | Multi-components phase (Intermediate Layer) | ○ | ○ | X | X |

Evaluation Test 3

Heat resistance tests were conducted for the sum of eight kinds of SOFC test pieces obtained in Example 1 and Examples 5 to 10 and Comparative Example 1 in a $N_2$ atmosphere at the temperature of 600° C. for four hours by varying the temperature rise time and the temperature drop time, between the room temperature and the raised temperatures of 600° C., at the rates of six hours, five hours, four hours and three hours, respectively. That is, surface and cross sectional observations for the respective test pieces were conducted to investigate whether the peeling-off or cracks of the associated films were caused in the laminated structures formed on the SiN diaphragm substrates S, respectively, with evaluated results being shown in the following Table 3. As will be apparent from the results of Table 3, it was confirmed that there were further effective areas in the respective thin film layers which formed the alternating laminated structural sections 40, 50, and it appeared that, especially, when each thin film thickness remained in a range from 20 nm to 50 nm, preferable heat resistance properties were obtained at either one of the temperature rise time and temperature drop time (as represented by a symbol ○ especially as to Examples 1 and 6 in Table 3). Further, even in a case where the thin film layers are formed in the alternating laminated structural sections 40, 50 so as to provide the graduations in the film thickness, it is apparent that the alternating laminated structural sections 40, 50 have desired heat resistance properties (as represented by a symbol ○ especially as to Example 10 in Table 3).

TABLE 3

|  | Thin Film Thickness of Alternating Laminated Structural Sections | Holding Temperature (° C.) | | | |
| --- | --- | --- | --- | --- | --- |
|  |  | 400 | 500 | 600 | 700 |
| Example 5 | 5 nm | ○ | ○ | X | X |
| Example 6 | 20 nm | ○ | ○ | ○ | ○ |
| Example 1 | 50 nm | ○ | ○ | ○ | ○ |
| Example 7 | 100 nm | ○ | ○ | ○ | X |
| Example 8 | 500 nm | ○ | ○ | X | X |
| Example 9 | 1 μm | ○ | X | X | X |
| Example 10 | 10~50 nm (In Gradient) | ○ | ○ | ○ | ○ |
| Comparative Example 1 | Multi-components phase (Intermediate Layer) | ○ | X | X | X |

EXAMPLE 11

Example 11 is described below mainly with reference to FIGS. 7A and 7B.

Figure 7A:
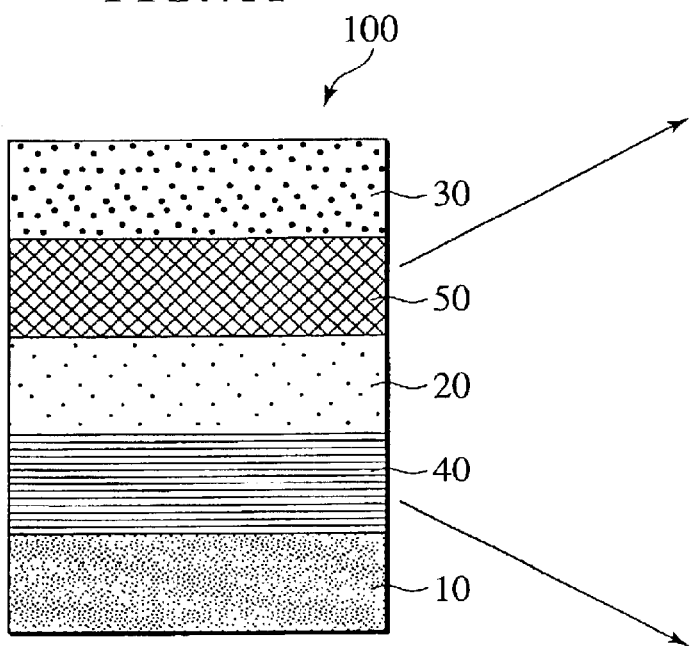
FIG. 7A is a cross sectional view of an SOFC of Example 11 of the preferred embodiment.
Figure 7B:
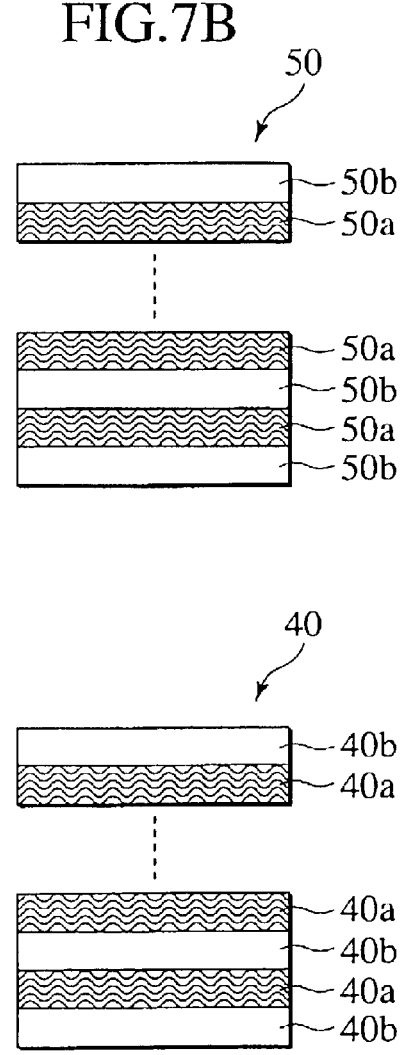
FIG. 7B is an enlarged cross sectional view of first and second alternating laminated structural sections of the SOFC shown in FIG. 7A.

In this Example, although an SOFC (unit cell) 100 shown in FIG. 7A was fabricated in the same structure as that of Example 1 with respect to a feature in that the alternating laminated structural sections 40, 50 were provided, the oxidizing electrode layer was structured so as to serve as the substrate on which the alternating laminated structural sections 40, 50 were alternately layered in sequence. Also, in this Example, RF sputtering method is conducted by an RF sputtering apparatus which was able to suitably apply bias voltages to targets of a target substrate which was provided with a target of a sintered body of $(La_{0.8}, Sr_{0.2})CoO_{3-d}$ (hereinafter referred to as LSC), a target of a sintered body of $(La, Sr)(Ga, Mg)O_{3-d}$ (hereinafter referred to as LSGM), a metal target of Ni, and a metal target of Ag, with a detail of the RF sputtering apparatus being omitted in the figure.

Initially, a porous LSC oxidizing electrode substrate 10 having a porosity rate of 35%, an average porous diameter of 0.5 μm, a size of 50 mm square and a thickness of 1.5 mm was prepared.

Then, on the LSC oxidizing electrode substrate 10, an alternating laminated structural section 40 was formed by RF sputtering method. More particularly, initially, the alternating laminated structural section 40 was layered with a co-sputtered layer 40b of Ag and LSGM with a film thickness of 50 nm as a first layer. During such a film forming operation, power outputs for sputtering the Ag target and the LSGM target were determined such that the existence ratio between the Ag and LSGM was 50:50 by way of mass. Further, such a film forming step was carried out while applying the bias voltage of 75 volts between the LSC oxidizing electrode substrate 10 and the respective targets, with a film forming condition being held in the Ar atmosphere at the pressure of 10 Pa. Subsequently, on the Ag-LSGM co-sputtered layer 40b, a LSC layer 40a was layered with a film thickness of 50 nm as a second layer of the alternating laminated structural section 40. The film forming condition for the LSC layer 40a was selected to be identical with that of the first layer 40b of the alternating laminated structural section 40. Such film forming steps for the Ag-LSGM co-sputtered layer 40b with the thickness of 50 nm and the LSC layer 40a with the thickness of 50 nm were alternately and similarly conducted four cycles. Further, on a surface of the LSC layer 40a forming the eighth layer of the alternating laminated structural section 40, the Ag-LSGM layer 40b was layered with a film thickness of 50 nm again, forming the alternating laminated structural section 40 composed of the sum of five layers of the Ag-LSGM layers 40b and the sum of four layers of the LSC layers 40a.

Subsequently, on a surface of the Ag-LSGM layer 40b forming a ninth layer of the alternating laminated structural section 40, a LSGM layer was formed with a thickness of 1 μm as the solid electrolyte layer 20. Such film forming operation for the LSGM solid electrolyte layer 20 was conducted without applying the bias voltage to between the substrate and the targets in a manner different from the alternating laminated structural section 40. The film forming condition was selected to be the same Ar atmosphere and the pressure of 10 Pa as those maintained heretofore.

Next, on an upper surface of the LSGM solid electrolyte layer 20, an alternating laminated structural section 50 was formed. More particularly, initially, on the LSGM solid electrolyte layer 20, a Ni-LSGM co-sputtered layer 50b was layered with a thickness of 50 nm using both targets of metal of Ni and a sintered body of LSGM. During such a sputtering operation, power outputs required for sputtering the Ni target and LSGM target were selected, respectively, such that the co-sputtered layer had the existence ratio of 50:50 by way of mass. Also, such a film forming step was carried out while applying the bias voltage of 75 volts between the LSC oxidizing electrode substrate 10 and the respective targets, with a film forming condition being held in the Ar atmosphere at the pressure of 10 Pa. Then, on the Ni-LSGM co-sputtered layer 50b, a Ni layer 50a was layered with a thickness of 50 nm serving as a second layer of the alternating laminated structural section 50. The film forming condition for such Ni layer 50a was selected to be the same as used in forming the first layer 50b of the alternating laminated structural section 50. Such film forming steps for the Ni-LSGM co-sputtered layer 50b with the thickness of 50 nm and the Ni layer 50a with the thickness of 50 nm were alternately and similarly conducted four cycles. Further, on an upper surface of the Ni layer 50a forming the eighth layer of the alternating laminated structural section 50, the Ni-LSGM layer 50b was layered with a film thickness of 50 nm, forming the alternating laminated structural section 50 composed of the sum of five layers of the Ni-LSGM layers 50b and the sum of four layers of the Ni layers 50a.

Finally, on a surface of the Ni-LSGM layer 50b forming a ninth layer of the alternating laminated structural section 50, a Ni layer was formed with a thickness of 2 $\mu$m as the reducing electrode layer 30, obtaining an SOFC (unit cell) 100 of this Example. Such film forming operation was conducted while applying the bias voltage of 75 volts to between the LSC oxidizing electrode substrate and the respective targets at the Ar atmosphere and the pressure of 10 Pa.

Electric power generation tests were implemented using the resulting SOFC (unit cell) of this Example fabricated in a manner set forth above, i.e. the unit cell 100 composed of respective film layers sequentially formed on the LSC oxidizing electrode substrate 10 having the porosity rate of 35%, the average porous diameter of 0.5 $\mu$m, the size of 50 mm square and the thickness of 1.5 mm was prepared. During such electric power generation tests, electric power outputs were measured by raising the temperature of the unit cell 100 to the holding temperature of 700° C. at the temperature rise rate of 100° C./h while introducing reducing gas of $H_2$ and oxidizing gas of $O_2$.

As a result, the maximum power output was obtained at a value of 150 mW/cm$^2$. Further, it was confirmed that when observing the surface and the cross section of the unit cell 100, after the temperature was dropped to the room temperature at the temperature drop rate of 100° C./h subsequent to the electric power generation test, there were no peeling-off in the associated layers or no cracks caused in the unit cell 100, and it revealed a desired heat resistance property.

Further, while the above preferred embodiments have been described in conjunction with the examples which employed the RF sputtering techniques, the present invention is not limited thereto and may be applied with various other film forming processes such as PVD, CVD, printing operation and electrophoresis.

Furthermore, of course, the size of the substrate and the number of layers which are formed in the above examples are not restricted.

As set forth above, the present invention provides an excellent advantage in that the SOFC of the present invention presupposes the structure in which the solid electrolyte is kept between the oxidizing electrode layer and the reducing electrode layer and contemplates the provision of the alternating laminated structural section, which are alternately layered with the thin film layers composed of different coefficients of thermal expansion, between the oxidizing electrode layer and the solid electrolyte layer and/or the reducing electrode layer and the solid electrolyte layer for thereby mitigating stresses caused by heat in the adhesion of the associated layers to effectively preclude the associated layers from being peeled off from one another with a resultant improvement in a heat resistance property.

The entire content of a Patent Application No. TOKUGAN 2001-246066 with a filing date of Aug. 14, 2001 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A solid oxide electrolyte type fuel cell comprising:
an oxidizing electrode layer;
a reducing electrode layer provided in opposition to the oxidizing electrode layer;
a solid electrolyte layer provided between the oxidizing electrode layer and the reducing electrode layer; and
an alternating laminated structural section provided in at least one of an area between the oxidizing electrode layer and the solid electrolyte layer and an area between the reducing electrode layer and the solid electrolyte layer, the alternating laminated structural section including a first thin film layer, which includes a material of corresponding one of the oxidizing electrode layer and the reducing electrode layer, and a second thin film layer, which has a phase including the material of the corresponding one of the oxidizing electrode layer and the reducing electrode layer and a material of the solid electrolyte layer, and the first thin film layer and the second thin film layer being alternately laminated.

2. The solid oxide electrolyte type fuel cell according to claim 1, wherein the alternating laminated structural section is respectively provided between the oxidizing electrode layer and the solid electrolyte layer and between the reducing electrode layer and the solid electrolyte layer.

3. The solid oxide electrolyte type fuel cell according to claim 1, wherein the first thin film layer of the alternating laminated structural section further includes a material which differs from the material of the corresponding one of the oxidizing electrode layer and the reducing electrode layer to show a function as the corresponding one of the oxidizing electrode layer and the reducing electrode layer.

4. The solid oxide electrolyte type fuel cell according to claim 1, wherein the first thin film layer of the alternating laminated structural section positioned in an area closer to the corresponding one of the oxidizing electrode layer and the reducing electrode layer has a film thickness thicker than a film thickness of the first thin film layer of the alternating laminated structural section positioned in an area closer to the solid electrolyte layer.

5. The solid oxide electrolyte type fuel cell according to claim 1, wherein the second thin film layer of the alternating laminated structural section positioned in an area closer to the corresponding one of the oxidizing electrode layer and the reducing electrode layer has a film thickness thinner than a film thickness of the second thin film layer of the alternating laminated structural section positioned in an area closer to the solid electrolyte layer.

6. The solid oxide electrolyte type fuel cell according to claim 1, wherein the first thin film layer of the alternating laminated structural section and the second thin film layer of the alternating laminated structural section have film thickness of equal to or less than 1 $\mu$m.

7. The solid oxide electrolyte type fuel cell according to claim 1, wherein the first thin film layer of the alternating laminated structural section and the second thin film layer of the alternating laminated structural section have film thickness of equal to or less than 1 $\mu$m.

8. A solid oxide electrolyte type fuel cell comprising:
an oxidizing electrode layer;
a reducing electrode layer provided in opposition to the oxidizing electrode layer;
a solid electrolyte layer provided between the oxidizing electrode layer and the reducing electrode layer; and
an alternating laminated structural section provided in at least one of an area between the oxidizing electrode layer and the solid electrolyte layer and an area between the reducing electrode layer and the solid electrolyte layer, the alternating laminated structural section including a first thin film layer, which includes a material of corresponding one of the oxidizing electrode layer and the reducing electrode layer, and a second thin film layer, the first thin film layer and the second thin film layer being alternately laminated, and the second thin film layer having a coefficient of thermal expansion with a value between a coefficient of thermal expansion of the material of the corresponding one of the oxidizing electrode layer and the reducing electrode layer and a coefficient of thermal expansion of a material of the solid electrolyte layer or a value equivalent to the coefficient of thermal expansion of the material of the solid electrolyte layer.

9. The solid oxide electrolyte type fuel cell according to claim 8, wherein the alternating laminated structural section is respectively provided between the oxidizing electrode layer and the solid electrolyte layer and between the reducing electrode layer and the solid electrolyte layer.

10. The solid oxide electrolyte type fuel cell according to claim 8, wherein the first thin film layer of the alternating laminated structural section further includes a material which differs from the material of the corresponding one of the oxidizing electrode layer and the reducing electrode layer to show a function as the corresponding one of the oxidizing electrode layer and the reducing electrode layer.

11. The solid oxide electrolyte type fuel cell according to claim 8, wherein the first thin film layer of the alternating laminated structural section positioned in an area closer to the corresponding one of the oxidizing electrode layer and the reducing electrode layer has a film thickness thicker than a film thickness of the first thin film layer of the alternating laminated structural section positioned in an area closer to the solid electrolyte layer.

12. The solid oxide electrolyte type fuel cell according to claim 8, wherein the second thin film layer of the alternating laminated structural section positioned in an area closer to the corresponding one of the oxidizing electrode layer and the reducing electrode layer has a film thickness thinner than a film thickness of the second thin film layer of the alternating laminated structural section positioned in an area closer to the solid electrolyte layer.

13. A method of manufacturing a solid oxide electrolyte type fuel cell, comprising:

forming one of an oxidizing electrode layer and a reducing electrode layer;

forming a solid electrolyte layer on the one of the oxidizing electrode layer and the reducing electrode layer;

forming another one of the oxidizing electrode layer and the reducing electrode layer on the solid electrolyte layer; and forming an alternating laminated structural section in at least one of an area between the oxidizing electrode layer and the solid electrolyte layer and an area between the reducing electrode layer and the solid electrolyte layer, the alternating laminated structural section including a first thin film layer, which includes a material of corresponding one of the oxidizing electrode layer and the reducing electrode layer, and a second thin film layer, which has a phase including the material of the corresponding one of the oxidizing electrode layer and the reducing electrode layer and a material of the solid electrolyte layer, and the first thin film layer and the second thin film layer being alternately laminated.

14. A method of manufacturing a solid oxide electrolyte type fuel cell, comprising:

forming one of an oxidizing electrode layer and a reducing electrode layer;

forming a solid electrolyte layer on the one of the oxidizing electrode layer and the reducing electrode layer;

forming another one of the oxidizing electrode layer and the reducing electrode layer on the solid electrolyte layer; and forming an alternating laminated structural section in at least one of an area between the oxidizing electrode layer and the solid electrolyte layer and an area between the reducing electrode layer and the solid electrolyte layer, the alternating laminated structural section including a first thin film layer, which includes a material of corresponding one of the oxidizing electrode layer and the reducing electrode layer, and a second thin film layer, the first thin film layer and the second thin film layer being alternately laminated, and the second thin film layer having a coefficient of thermal expansion with a value between a coefficient of thermal expansion of the material of the corresponding one of the oxidizing electrode layer and the reducing electrode layer and a coefficient of thermal expansion of a material of the solid electrolyte layer or a value equivalent to the coefficient of thermal expansion of the material of the solid electrolyte layer.

* * * * *